United States Patent Office 3,551,362
Patented Dec. 29, 1970

3,551,362
MICROPOROUS SHEET AND PROCESS FOR ITS PRODUCTION
Erhard K. H. Decker, Quickborn, Germany, assignor to W. R. Grace & Co., Cambridge, Mass., a corporation of Connecticut
No Drawing. Filed Dec. 20, 1967, Ser. No. 691,923
Claims priority, application Germany, Jan. 5, 1967, G 48,931
Int. Cl. C08g 37/16, 53/08
U.S. Cl. 260—2.5                    6 Claims

ABSTRACT OF THE DISCLOSURE

A microporous sheet composed of a mixture of (A) a resin of a polyhydroxy benzene having at least one active ortho or para position (e.g., resorcinol) and a reactive aldehyde or ketone (e.g., formaldehyde); and (B) a thermoplastic polymer which is compatible with the resin (e.g., polyvinyl chloride). The sheet can be made by adding the polyhydroxy benzene and aldehyde or ketone to an aqueous dispersion of the thermoplastic polymer, curing the resulting mixture under conditions which do not permit the loss of volatile components and evaporating the volatile components.

---

This invention relates to novel microporous articles. More particularly, this invention relates to microporous sheets suitable for use, for example, as battery separators for electric storage batteries.

Various types of battery separators are employed in lead acid batteries to prevent direct contact between plates of opposite polarity and at the same time, permitting the passage of electrolyte. The known battery separators may be divided into two groups, namely (1) coarsely pored separators with an average pore diameter of 10 to 50 microns and (2) microporous separators with a pore size of 5 microns and under. The separators with large pores, e.g., separators made from cellulose fibers impregnated with a phenol/formaldehyde resin or of sintered polyvinyl chloride may be produced rather economically, but their properties are not entirely satisfactory since the relatively large pores may effect "treeing," resulting in shorting out of the plates. The relatively large pore size may also permit antimony diffusion which results in loss of battery efficiency.

A number of different materials have been employed to prepare microporous separators. Separators of wood are destroyed in a relatively short time by the battery acid, as well as by oxidation. Battery separators have been produced by embedding starch particles in a solution of polyvinyl chloride and the particles removed by digestion of the starch to produce the pores after the battery separator has been shaped and the solvent evaporated. However, extracting the starch particles is laborious and the production of such separators, therefore is very costly. A further disadvantage resides in the fact that polyvinyl chloride separators show poor thermostability due to the thermoplastic nature of PVC whereby such PVC separators tend to shrink and to be deformed leading finally to a breakdown of the battery. Another microporous separator is produced by coagulating an aqueous rubber latex to a jellylike mass and hardening and curing the mass and subsequently evaporating the water to obtain a microporous plate. Such separators show a number of disadvantages. Curing the latex to obtain hard rubber plates or sheets is time consuming and requires high temperatures and steam pressures which makes production very costly. Also, hard rubber separators are very sensitive to oxidation and are subject to aging during storage.

A microporous sheet suitable for use as a battery separator has now been found which is thermostable and possesses excellent resistance against oxidation and battery acid and which is produced in a simple and economic manner. In addition, the novel sheet possesses a wide range of mechanical properties such as elasticity, impact strength and abrasion resistance.

The novel microporous sheet of the present invention comprises a mixture of (A) a resin of a polyhydroxy benzene and a carbonyl compound, which can be a reactive aldehyde or ketone, which polyhydroxy benzene has an activated position in at least one of the ortho and/or para positions; and (B) a thermoplastic polymer compatible with said first polymer. Generally, the novel microporous sheet comprises 5 to 80% by weight of resin based on the weight of the thermoplastic polymer.

The microporous sheet of the present invention is prepared by incorporating a hydrophilic polyhydroxy benzene-carbonyl compound resin which is curable, in an aqueous thermoplastic polymer dispersion at low temperatures thereby forming a thermosetting backbone and obtaining a microporous product by evaporating the volatile components from the cured sheet. If necessary, the thermosetting resin backbone can be further cured at elevated temperatures. The polyhydroxy benzene having activated ortho- and/or para positions and reactive aldehyde or ketone, e.g. formaldehyde, are added in amounts sufficient to provide a non-collapsible structure with a cured resin backbone. An accelerator is added and the mixture is cured without allowing the water to evaporate and, if necessary, warming it to obtain thin sheets or plates with the water and acid finely dispersed therein, and the volatile components subsequently evaporated. Evaporation may be achieved by heating, e.g., to a temperature of 100 to 250° C., thereby simultaneously completely curing the resin. However, it is critical that the resin is cured, preferably at temperatures between 70 and 100° C., to form a thermosetting condensation product while retaining the water in the mixture. This backbone may be further cured when evaporating the water at elevated temperatures without destroying the microporous structure.

The polyhydroxy benzene resins employed in the present invention are resins of polyhydroxy benzenes and aldehydes or ketones which aldehydes and ketones are reactive, that is, capable of entering into condensation reactions with the polyhydroxy benzenes. Suitable aldehydes and ketones often contain 1 to about 15 carbon atoms and include formaldehyde, acetaldehyde, furfuryl, benzaldehyde, aliphatic ketones such as acetone, methyl ethyl ketone, etc., aromatic ketones, such as acetophenone, etc. Preferred are the alkanals such as formaldehyde, acetaldehyde, propionaldehyde, butyraldehyde, valeraldehyde, etc. Suitable polyhydroxy benzenes, with or without substituents other than the hydroxy group, direct further substitution into the ortho- and/or para positions relative to the hydroxy groups attached to the benzene ring. The term "active ortho- and/or para positions" as used herein and in the claims is to be understood in this meaning. Phloroglucinol (1,3,5 - trihydroxy benzene) where all ortho- and para positions are activated reacts fastest with the reactive aldehyde or ketone, while pyrogallol (1,2,3-trihydroxy-benzene) reacts much slower and the reaction rate of resorcinol (1,3-dihydroxy benzene) is in between. The resin precursors should be water soluble to allow preparation of aqueous solutions thereof.

Usually about 5 to 80% by weight based on the weight of the solids of the polymer dispersion, of polyhydroxy benzene and 1.2 and 2 moles of carbonyl compound per mole of polyhydroxy benzene are added. Unreacted carbonyl compound is removed together with the water and other volatile components are precuring of the resin. Surprisingly, no coagulation is observed at room temperature when aqueous solutions of carbonyl compound, for instance, formaldehyde, polyhydroxy benzene and an accelerator, usually an acid, are added to the aqueous polymer dispersion, while at elevated temperatures, solidification occurs fairly rapidly.

The aqueous thermoplastic polymer dispersion used in the invention must be compatible with the polyhydroxy benzenes, carbonyl compounds and mineral acids employed. The term "compatible" as used herein refers to any dispersion which does not coagulate or separate into two phases when the resin precursors and the accelerator are added. It has been found that the compatibility depends to some extent on the nature of the emulsifier used for preparing the polymer dispersion or latex. Usually for any chosen polymer a suitable emulsifier can be found as will be apparent to one skilled in the art. Among the polymers which can advantageously be employed in the invention are thermoplastic polymers of monomers containing a terminal

or vinyl group such as polymers of monovinyl compounds, for example, polyvinyl chloride, polyvinylidene chloride, polystyrene, polyacrylonitrile, polyvinylacetate and acrylic polymers; thermoplastic polymers of mono-olefins, such as polyethylene: thermoplastic polymers of conjugated aliphatic dienes usually of 4 to 9 carbon atoms, such as, polybutadiene, chlorinated and carboxylated butadiene polymers, for example, 2-chloro-butadiene polymers, etc. Also two or more of these polymers can be combined to obtain specific desired mechanical or electrical properties, such as polyvinyl chloride and styrene/butadiene or polyvinyl chloride and polyvinylidene chloride.

The aqueous resin/polymer mixture is normally diluted with water to obtain a total solids content of about 10 to 75, preferably 30 to 50% by weight. To a great extent the pore volume of the final product depends on the water content of the mixture. The pore volume as defined below will usually be between 0.3 and 3, preferably 0.5 and 2 cm.$^3$/g. The physical properties such as electrical resistance and air permeability are directly related to the pore volume. Since some of the thermoplastic polymers which may be employed are hydrophobic, a wetting agent can be incorporated, unless the emulsifying or stabilizing agents of the polymer dispersion have sufficient wetting properties. Typical examples are sodium alkylbenzene sulfonate, sodium lauryl sulfate, isoctylphenyl polyoxyalkylene ethyalcohol, diocrylsulfosuccinate and others.

Precuring of the mixture is preferably carried out on a suitable carrier. The mixtures of this invention show good release on substrates such as glass, stainless steel, silicon rubber, tetrafluoroethylene, polyolefins and similar materials. After pouring the mass onto a carrier, the mass solidifies rapidly when warmed to approximately 70 to 100° C. When heating it, precautions have to be observed not to evaporate the water which is dispersed in the resin. Therefore, warming of the mixture is carried out either in a closed system or in a liquid bath or a saturated steam atmosphere. The pore volume of the final product usually approaches the water content of the latex/resin mixture. A greater pore volume may be caused by a greater number of pores or by a larger size of the single pores as has been shown by measuring the permeability for air of the sheets produced according to this invention. If desired, prior to solidifying an inert filler and/or fibers may be added to the aqueous mixture of resin precursors and polymers in amounts up to 300% by weight based on the total solids of the latex. Preferably fillers known to the art which are not detrimental to the operation of a battery may be used, such as silica, alumina, carbon black, coal dust, mica, kaolin, asbestos, diatomaceous earth, vermiculite, wood flour, glass particles, barium sulphate and others. However, it will be apparent that no fillers can be employed which will coagulate the polymers and cause phase separation of the dispersion. It is known that some latices are particularly sensitive to di- and trivalent metal ions which should therefore not be present in the fillers used. This addition of fillers allows considerable savings of resin without impairing the properties of the battery separator or other products made from the microporous sheet.

Fibers, such as glass, cellulose, asbestos or synthetic fibers may be added to impart desired mechanical properties to the final sheet product.

Desirably, when the novel microporous sheet is used as a battery separator it can be provided with ribs on one or both sides. By using an appropriately shaped carrier during solidification of the resin it is possible to obtain such ribs in a very simple fashion when producing the battery separators according to this invention. On the other hand, it is also possible to apply afterwards ribs of the same or another material to the flat surface of the cured separator.

Additional curing of the thermosetting resin component and evaporation of the volatile components which are dispersed in the solidified mass can be accomplished in one step if desired. The temperature used is preferably in the range of 100 and 250° C. When a higher temperature is used, then less time is required for this step of the process but care must be taken not to degrade the polymers or any fillers or fibers present in the product. The required temperature further depends on the type of acid used as the condensation agent. If a volatile acid, i.e., a halogen hydacid, sulphurous acid, nitric acid, or formic acid, was used, it can be evaporated together with the water by heating to the appropriate temperature. In case a not easily volatized or non-volatile acid is used, i.e., a sulphuric acid, or phosphoric acid, it may become necessary to wash the precured separator thoroughly with water to remove the acid. Frequently such washing step is desirable in order to remove all water soluble salts which may interfere with the functioning of the battery.

The final product will typically comprise 20 to 100% of resin and polymers, 0 to 30% of fibers and 0 to 80% of inert fillers, all based on the total weight of the product.

The electrical resistance of the new separators is extremely low, i.e., in the range between 50 and 150 milliohms per square centimeter for separators with a 0.5 mm. base having ribs 2 mm. high. As aforementioned, their pore volume usually is between 0.3 and 3 cubic meters per gram and the size of the pores is very small, i.e., about 0.5 to 5 microns.

The following non-limiting examples illustrate the preparation of the novel microporous sheets of the present invention. Unless otherwise stated, all percentages are by weight.

EXAMPLE 1

To 20 g. of a polyvinyl chloride latex with a solids content of about 50% was added 5 g. of a 35% aqueous solution of formaldehyde and 3 g. resorcinol dissolved in 5 g. of water. 1 g. of 35% nitric acid was added as accelerator and the mixture was then poured onto a flat mold in a layer which was 0.5 mm. thick. The mold was tightly covered with a glass plate in order to prevent evaporation of the water and the mass was precured by heating it to 70 to 90° C. whereupon the resin mixture solidified. The water-containing resin plate thus obtained was removed from the mold and was heated for a few minutes to about 180° C. to cure the resorcinol/formaldehyde resin. Simultaneously all water and other volatile components were evaporated. The microporous sheet obtained was 0.5 mm. thick. The pore volume of this battery separator was found to be about 1.3 cubic centimeters per gram which corresponds almost exactly to the content of volatile components in the resin mixture prior to curing. The pore volume was determined by immersing in water a piece of the microporous sheet (weight g.) and weighing again after saturation with water (water take up in cm.$^3$) to determine the increase in weight (weight G; increase in weight $G-g$), i.e., $$\text{pore volume (in cm.}^3\text{/g)} = \frac{G-g}{g}$$

The Gurley air flow time (time required by 62 cc. of air at 140 g. pressure to pass 1 cm.$^2$ of the plate) was 12 minutes corresponding to an average pore-size of 2 to 4μ. The electrical resistance was found to be 60 milliohms per square centimeter.

EXAMPLE 2

To 15 g. of a polyvinyl chloride latex and 5 g. of a styrene/butadiene latex (solids content of both latices about 50%) was added 5 g. of a 36% aqueous formaldehyde solution and 3 g. of resorcinol dissolved in 5 g. of water, and 5 g. of 8% aqueous hydrochloric acid as accelerator. This mixture was distributed on a carrier made of silicon rubber which was provided with grooves 1.5 mm. deep in order to produce battery separators with integral ribs. For mechanically reinforcing the final product the carrier was covered with a glass-fiber mat weighing about 30 g./m.$^2$. The product was precured as described in Example 1 and was then cured and the volatile components were driven off. The final sheet was 0.5 mm. thick while the ribs had a thickness of about 2.0 mm. The electrical resistance was found to be 14 milliohms per square centimeter and the air-flow measured was 12 minutes. A bending test in direction of the ribs showed that the bending diameter was about 4 cm., i.e., the ribs of the separator cracked when the separator was bent around a tube with a diameter of 4 cm.

EXAMPLE 3

15 g. of an acrylonitrile/butadiene latex was blended with 5 g. of a polystyrene/butadiene latex (both latices having a solids content of about 50%). To this mixture was added 5 g. of a 36% formaldehyde solution and a solution of 2 g. of resorcinol in 3 ml. water. 5 ml. of 8% hydrochloric acid was incorporated as accelerator. A glass fiber mat was used for reinforcing the product as described in Example 2. Further treatment of the mixture was carried out as outlined in Examples 1 and 2. The mechanical and electrical properties were substantially identical with those of the product obtained in Example 2.

EXAMPLE 4

The procedure of Example 3 was followed but 10 g. of silica dust was incorporated as filler prior to the precuring. The electrical resistance of the final product was 102 milliohms per square centimeter, the airflow (Gurley) was 15 minutes, and the bending diameter was found to be 8 cm.

EXAMPLE 5

10 g. of a 50% polyvinylidene chloride latex was blended with 10 g. of a polystyrene/butadiene latex and 2.5 g. of resorcinol dissolved in 10.0 g. water and 4.0 g. of a 36% formaldehyde solution was added to this mixture. After addition of 1 g. of 50% nitric acid this mixture was used to produce a 0.5 mm. sheet without reinforcement by fibers. The electrical resistance was 48 milliohms per square centimeter, and the airflow was measured to be 10 minutes. This product can be bent around an angle of 180° without breaking.

EXAMPLE 6

To 20 g. of a copolymer latex based on polyvinylidene chloride (total solids 55%) there was added 25 g. of a solution of 5 g. resorcinol in water and 10 g. of a 36% formaldehyde solution together with 5 g. of 8% hydrochloric acid as accelerator. After thorough mixing this mass was poured onto a glass plate covered with a glass fiber mat and was then warmed for 2 minutes to a temperature of 95° C. after covering the first glass plate with a second glass plate.

Subsequently the product was removed from the glass plates and dried at 160° C. The sheet obtained had a thickness of 0.45 mm., gave a Gurley value (airflow) of 8 minutes, had an electrical resistance of 48 milliohms per square centimeter and a pore volume of 1.8 cm.$^3$/g.

EXAMPLE 7

To 20 g. of a copolymer latex based on polyvinyl acetate (total solids 51%) was added 15 g. of an aqueous resorcinol solution containing 3 g. of resorcinol together with 5 g. of a 36% formaldehyde solution and 5 ml. of 8% hydrochloric acid. From this mixture a sheet of 0.58 mm. thickness was prepared as described in the preceding example. The Gurley value of the product was 3 minutes, the electrical resistance 72 milliohms per square centimeter, and the pore volume 1.7 cm.$^3$/g.

EXAMPLE 8

To 10 g. of a 2-chlorobutadiene latex (total solids about 50%) was added 5 g. of a commercially available stabilizer (5% solution). Then 10 g. of a solution of 4 g. resorcinol in water and 10 g. of 36% formaldehyde solution was together with 3 g. of 8% hydrochloric acid. From this mixture a sheet having a thickness of 0.42 mm. was prepared as described in Example 6. The pore volume of the product was 1.1 cm.$^3$/g., the Gurley value was 50 minutes, and the electrical resistance was 78 milliohms per square centimeter.

EXAMPLE 9

2 g. of phloroglucinol was dissolved in 10 g. of hot water and then 20 g. of a 50% PVC-latex was added to the warm solution with stirring followed by 5 g. of 36% aqueous formaldehyde solution. This mixture was precured by the addition of 1 ml. of 8% hydrochloric acid as an accelerator. The product obtained from this mixture as described in Example 1 shows substantially the same properties, i.e., an electrical resistance of 60 milliohms per square centimeter and an airflow of 12 minutes.

EXAMPLE 10

4 g. of pyrogallol was dissolved in 10 g. of water with heating in order to complete the dissolution. To the hot solution was added 20 g. of a 50% solids PVC latex and 5 g. of 36% aqueous formaldehyde solution together with 5 ml. of 8% hydrochloric acid as the accelerator. The mixture was distributed on a carrier and was heated for 5 minutes to a temperature of 90° C. to precure it. As in the previous examples precuring was carried out in a closed system in order to avoid the evaporation of any volatile components. The properties of the product were essentially identical with those found for the sheet of Example 6.

The following experiments show the effect on the product properties of the resorcinol resin and the water content as well as the content of filler.

Experiments A, B, and C were carried out as described above in Example 6. It was found that the pore volume is decreased when the resorcinol and the water content is lowered and the air permeability and the electrical resistance go up. By suitably selecting the amounts of polyhydroxy benzene resin and water it is, therefore, possible to prepare a sheet with the desired physical properties.

In experiments D and H quartz flour was mixed with the resorcinol solution, the formaldehyde solution and optionally water in order to obtain a homogenous suspension. This suspension was then added to the latex whereafter the accelerator was added to the mixture. The mass was poured onto a warmed glass plate covered by a glass fiber mat; after covering with a second prewarmed glass plate the temperature was raised to 100° C. for about 60 seconds. The sheet formed was then dried at 170° C. The results of the physical measurements compiled in the following table show that the pore volume is decreased when raising the filler content whereby the electrical resistance and the air permeability are also increased. However, this effect can partially be compensated for by adding more water.

C. under conditions which do not permit the loss of volatile components, and (C) heating the resulting structure at a temperature between 100 and about 250° C. to evaporate the volatile components.

|  | A | B | C | D | E | F | G | H |
|---|---|---|---|---|---|---|---|---|
| Latex (g.) | 20 | 20 | 20 | 20 | 20 | 20 | 20 | 20 |
| 20% resorcinol solution (g.) | 15 | 10 | 5 | 7 | 7 | 7 | 7 | 7 |
| 36% formaldehyde solution (g.) | 51 | 5 | 5 | 5 | 5 | 5 | 5 | 5 |
| 8% hydrochloric acid (g.) | 5 | 5 | 5 | 5 | 5 | 5 | 5 | 5 |
| Filler (quartz flour) (g.) |  |  |  | 5 | 10 | 15 | 20 | (1) |
| Sheet thickness (mm.) | 0.57 | 0.50 | 0.42 | 0.58 | 0.56 | 0.55 | 0.59 | 0.59 |
| Gurley value (min.) | 8 | 16 | 35 | 20 | 26 | 32 | 32 | 24 |
| Electrical resistance (milliohms per square centimeter) | 66 | 72 | 144 | 120 | 132 | 132 | 180 | 138 |
| Pore volume (cm.³/g.) | 2.0 | 1.5 | 1.0 | 1.0 | 0.8 | 0.6 | 0.5 | 0.7 |

1 20+5g. H₂O.

Instead of using a stationary mold with a cover the closed system can also employ a pair of two endless belts running parallel in a short distance from each other whereby the mass can be precured between the two belts to a sheet of the desired thickness without escape of the water dispersed in the resin mixture. Such endless belts can for instance be of tetrafluoroethylene, silicon rubber, steel or other suitable material. As mentioned above it is also possible to provide these carriers with grooves for producing a battery separator with integral ribs on one or both sides.

Although possessing particular utility as a battery separator, the novel product may be employed wherever a microporous sheet is desired, e.g., a filter, membrane or diaphragm.

Since changes may be made in the above products and processes without departing from the scope of the invention, it is intended that all matter contained in the above description shall be interpreted as illustrative and not in a limiting sense.

I claim:

1. A process for the preparation of a microporous sheet particularly suitable for use as a battery separator which comprises:

(A) adding to an aqueous dispersion of 100 parts by weight of a thermoplastic polymer selected from the group consisting of the homopolymers and copolymers of compounds having a vinylidene group, the homopolymers and copolymers of mono-olefins and of aliphatic conjugated dienes having 4 to 9 carbon atoms, and mixtures of said polymers, (1) an aqueous solution of a carbonyl compound having from 1 to about 15 carbon atoms, selected from the group consisting of saturated aliphatic and aromatic aldehyde and ketones, (2) a polyhydroxybenzene having at least one active position o- or p- to the hydroxyl groups, said polyhydroxybenzene being selected from the group consisting of substituted and unsubstituted di- and trihydroxybenzenes, (3) said carbonyl compound and polyhydroxybenzene being present in a molar ratio within the range of 1.2 to 2 and in a quantity such as to form about 5 to 80 parts by weight of resin, (4) a catalytic quantity of an acid, and (5) enough water to adjust the final water content of the mixture to a value within the range of 25 to 90% by weight;

(B) pouring the resulting mixture on a carrier and heating at a temperature between about 60 and 100°

2. The process of claim 1 wherein the first heating step is carried out in an enclosed stationary mold.

3. The process of claim 1 wherein the first heating step is carried out between parallel endless belts.

4. The process of claim 1 wherein fillers are incorporated prior to pouring the aqueous mixture onto the carrier or mold.

5. A process as in claim 1 wherein the carbonyl compound is formaldehyde, the polyhydroxybenzene is resorcinol, and the thermoplastic polymer is polyvinyl chloride.

6. A microporous sheet comprising an intimate mixture of (A) about 5 to 80 parts by weight of the acid-catalyzed resinified product of (1) a carbonyl compound containing from 1 to about 15 carbon atoms, selected from the group consisting of saturated aliphatic and aromatic aldehydes and ketones, and (2) a polyhydroxybenzene having at least one active position o- or p- to the hydroxyl groups, said polyhydroxybenzene being selected from the group consisting of unsubstituted and substituted di- and trihydroxybenzenes, (3) the molar ratio of the carbonyl compound to the hydroxybenzene being within the range of about 1.2 to 2; and (B) 100 parts by weight of a thermoplastic polymer selected from the group consisting of the homopolymers and copolymers of compounds having a vinylidene group, the homopolymers and homopolymers of mono-olefins and of aliphatic conjugated dienes having 4 to 9 carbon atoms, and mixtures of said polymers, as prepared by the process of claim 1.

References Cited

UNITED STATES PATENTS

| 2,856,316 | 10/1958 | Van Gils | 260—2.5F |
| 2,946,095 | 7/1960 | Beer | 260—2.5P |
| 3,161,547 | 12/1964 | Beaulieu | 136—146 |
| 3,228,803 | 1/1966 | Little | 136—146 |
| 3,437,122 | 4/1969 | Van Gils | 260—846 |

FOREIGN PATENTS 6,601,099  8/1966  Netherlands _____ 136—146

JOHN C. BLEUTGE, Primary Examiner

U.S. Cl. X.R.

117—126; 136—146; 260—29.3, 38, 844, 846, 847; 264—47, 53